US012350934B2

(12) United States Patent
Maruyama et al.

(10) Patent No.: US 12,350,934 B2
(45) Date of Patent: Jul. 8, 2025

(54) LIQUID EJECTION HEAD AND LIQUID EJECTION APPARATUS

(71) Applicant: CANON KABUSHIKI KAISHA, Tokyo (JP)

(72) Inventors: Ayako Maruyama, Kanagawa (JP); Yoshiyuki Nakagawa, Kanagawa (JP); Takuro Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 18/345,493

(22) Filed: Jun. 30, 2023

(65) Prior Publication Data

US 2024/0009995 A1 Jan. 11, 2024

(30) Foreign Application Priority Data

Jul. 5, 2022 (JP) ................................. 2022-108581
Apr. 28, 2023 (JP) ................................. 2023-074226

(51) Int. Cl.
*B41J 2/14* (2006.01)

(52) U.S. Cl.
CPC .......... *B41J 2/1404* (2013.01); *B41J 2202/12* (2013.01)

(58) Field of Classification Search
CPC ............................ B41J 2/1404; B41J 2202/12
See application file for complete search history.

(56) References Cited

U.S. PATENT DOCUMENTS

2021/0094295 A1 * 4/2021 Nagai .................... B41J 2/1404

FOREIGN PATENT DOCUMENTS

JP 2017124610 A 7/2017

* cited by examiner

*Primary Examiner* — Lisa Solomon
(74) *Attorney, Agent, or Firm* — Canon U.S.A., Inc. IP Divsion

(57) ABSTRACT

A liquid ejection head including an ejection port forming part, a flow path forming part including a liquid chamber, and an individual supply flow path configured to supply liquid to the liquid chamber, and a substrate including a supply flow path configured to supply liquid to the individual supply flow path and an outflow flow path configured to cause liquid to flow out of the liquid chamber, wherein a height of the individual supply flow path is larger than a height from a surface of the liquid chamber facing the ejection port to the ejection port forming member, and when viewed from the direction perpendicular to the surface of the substrate, a sidewall surface of the liquid chamber on a side with the supply flow path (1) coincides with an end surface of the ejection port, or (2) is disposed within the ejection port.

15 Claims, 12 Drawing Sheets

FIG.6

| | Hs/μm | Hn/μm | D/μm | CIRCULATION EFFICIENCY/μm | L/μm | EJECTION STABILITY |
|---|---|---|---|---|---|---|
| CONFIGURATION EXAMPLE 1 | 5 | 10 | 35 | 4.4 | 5 | ○ |
| | | | | | 0 | ○ |
| CONFIGURATION EXAMPLE 2 | 5 | 15 | 30 | 2.9 | 5 | ○ |
| | | | | | 0 | ▲ |
| CONFIGURATION EXAMPLE 3 | 10 | 15 | 30 | 2.3 | 5 | ○ |
| | | | | | 0 | ▲ |
| CONFIGURATION EXAMPLE 4 | 20 | 15 | 30 | 1.8 | 5 | ▲ |
| | | | | | 0 | × |
| COMPARATIVE EXAMPLE 1 | 10 | 15 | 20 | 1.5 | 5 | × |
| COMPARATIVE EXAMPLE 2 | 20 | 30 | 20 | 0.8 | 5 | × |
| COMPARATIVE EXAMPLE 3 | 30 | 50 | 25 | 0.6 | 5 | × |

LIQUID EJECTION HEAD AND LIQUID EJECTION APPARATUS

BACKGROUND

Field of the Disclosure

The present disclosure relates to a liquid ejection head and a liquid ejection apparatus.

Description of the Related Art

In recent years, printing using a liquid ejection head has been utilized extensively, and with increase of use of printing, it has been expected that printing is able to be performed on various types of media. Optimum amounts of liquid droplets vary among target media. In printing on corrugated cardboards, for example, a liquid ejection head having the ejection amount per liquid droplet of 20 to 30 picoliters (pL) is used in some cases. Thus, the demand for stable and reliable ejection of a large liquid-droplet amount has been raised.

A liquid ejection head included in a liquid ejection apparatus that ejects liquid, such as ink, has an issue that a volatile component in the liquid evaporates from an ejection port from which the liquid is ejected, and thus a liquid viscosity in the vicinity of the ejection port may increase. This leads to a change in the ejection speed of an ejected liquid droplet and affects landing accuracy. In particular, in a case where a halt time after ejection is long, increase in liquid viscosity is significant, and the fluid resistance of liquid increases because of a solid component adhering to an area in the vicinity of the ejection port, which may results in an ejection defect.

Examples of measures against the above described issue include a method of causing liquid to flow into an ejection port part (inside a nozzle) of a liquid ejection head to prevent increase in liquid viscosity. Because the liquid flows not only in a flow path but also in the ejection port part, the liquid in the ejection port part is constantly replaced, whereby increase in viscosity of the liquid due to evaporation from the ejection port is reduced. Japanese Patent Application Laid-Open No. 2017-124610 discusses a liquid ejection head that causes liquid in a flow path of the liquid ejection head to efficiently flow into an ejection port part, by specifying a relationship among the height of the flow path, the thickness of a member forming an ejection port (the length of the ejection port part), and the length of the ejection port in a liquid flow direction in the flow path.

In order to increase the ejection amount per liquid droplet in the liquid ejection head having the configuration in which liquid is caused to efficiently flow into the ejection port part as discussed in Japanese Patent Application Laid-Open No. 2017-124610, the height of the flow path for supplying liquid to the ejection port may be increased, and the thickness of the member forming the ejection port may be increased. In this case, however, the liquid may not flow into the entire ejection port part, and an increase in liquid viscosity may occur.

SUMMARY

Aspects of the present disclosure generally provide a liquid ejection head capable of preventing an increase in liquid viscosity, and capable of ejecting a liquid droplet that is large in volume.

According to an aspect of the present disclosure, a liquid ejection head including an ejection port forming part having an ejection port from which liquid is ejected, a flow path forming part including a liquid chamber facing the ejection port in a direction of liquid ejection from the ejection port and configured to supply liquid to the ejection port, and an individual supply flow path configured to supply liquid to the liquid chamber, and a substrate including a supply flow path configured to cause liquid to flow into the individual supply flow path and an outflow flow path configured to cause liquid to flow out of the liquid chamber, wherein the following inequality is satisfied:

$$Hj>Hs,$$

where, in a direction perpendicular to a surface of the substrate, a height of the individual supply flow path is Hs μm, and a height from a surface of the liquid chamber facing the ejection port to the ejection port forming member is Hj μm, and wherein on a straight line passing through a center of the ejection port in a liquid flow direction when viewed from the direction perpendicular to the surface of the substrate, (1) a sidewall surface of the liquid chamber on a side with the supply flow path coincides with an end surface of the ejection port, or (2) the sidewall surface is disposed within the ejection port.

Further features of the present disclosure will become apparent from the following description of embodiments with reference to the attached drawings.

BRIEF DESCRIPTION OF THE DRAWINGS

FIG. 6 is a diagram illustrating ink circulation efficiency and ejection stability in liquid ejection heads of various shapes.

DESCRIPTION OF THE EMBODIMENTS

A liquid ejection head according to each of embodiments of the present disclosure will be described below with reference to the drawings. Each of the following embodiments is directed to an inkjet printing head from which ink as liquid is ejected and an inkjet printing apparatus, but the present disclosure is not limited thereto. The liquid to be ejected is not limited to ink. In each of the embodiments, a thermal-type element that generates a bubble by heat to eject liquid is used as an energy generating element, but the present disclosure is also applicable to a configuration using a piezoelectric-type element and elements of other various liquid ejection types.

Examples of the liquid ejection head of each of the embodiments include a line-type long head having a length corresponding to the width of a printed medium and a serial-type liquid ejection head that performs printing while scanning in a direction perpendicular to a direction of conveyance of a printed medium. Some of the serial-type liquid ejection heads have a plurality of printing element substrates, which is a case that separate printing element substrates for black ink and color ink are mounted, for example. In such a case, the plurality of printing element substrates can be disposed such that the ejection ports of adjacent printing element substrates overlap each other in an ejection port array direction.

Examples of the liquid ejection head of each of the embodiments include a head in which ink is supplied individually from ink tanks of cyan, magenta, yellow, and black (CMYK) to four ejection port arrays corresponding to the respective colors such that full color printing is able to be performed. The ejection port arrays for ejecting the respective inks of CMYK can be formed on the same printing element substrate. Alternatively, the ejection port arrays can be formed on separate printing element substrates.

The embodiments to be described below are preferred specific examples of the present disclosure, and provided with technically desirable various limitations. However, the present disclosure is not limited to the embodiments to be described below, as long as the idea of the present disclosure is satisfied.

Figure 1:
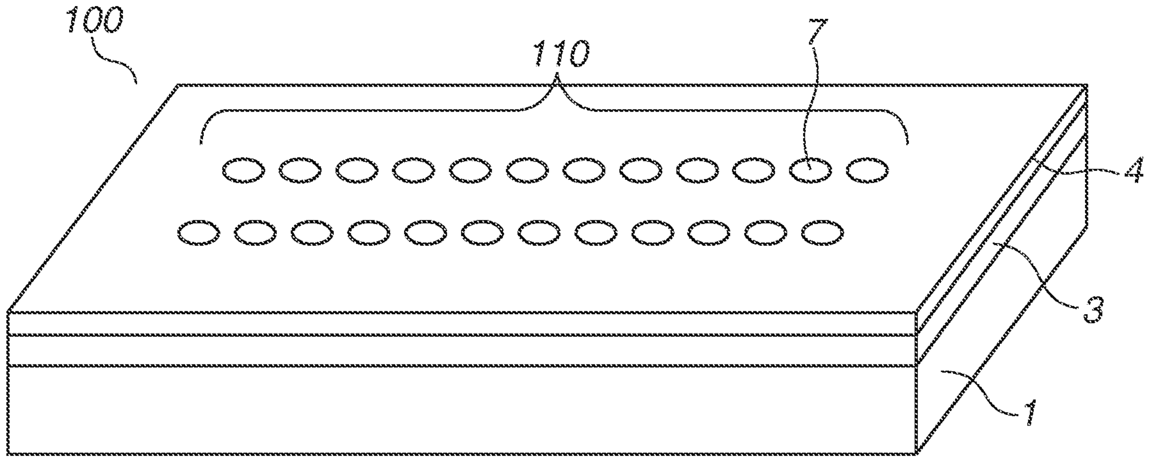
FIG. 1 is a diagram illustrating an example of a liquid ejection head according to the present disclosure.
Figure 2A:
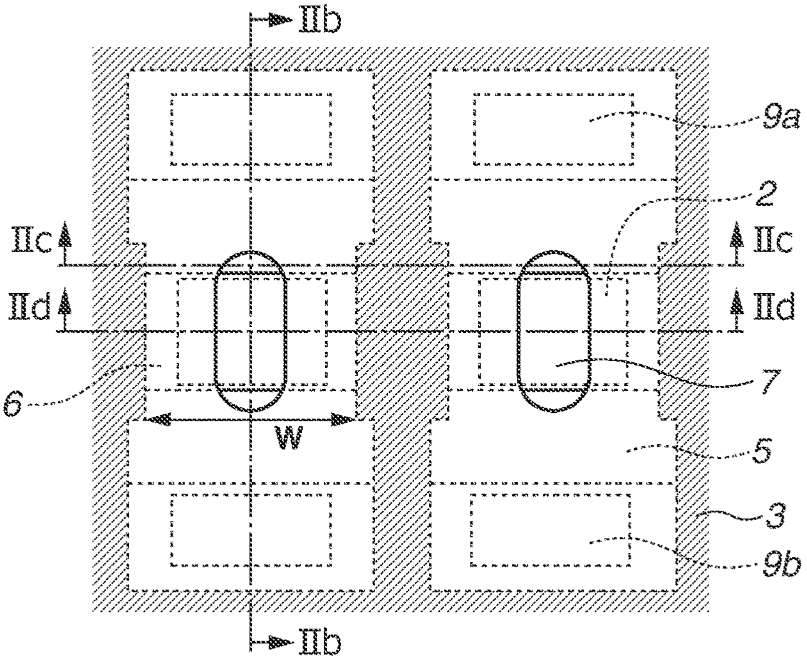
FIG. 2A is a plan view of a liquid ejection head according to a first embodiment of the present disclosure.
Figure 2B:
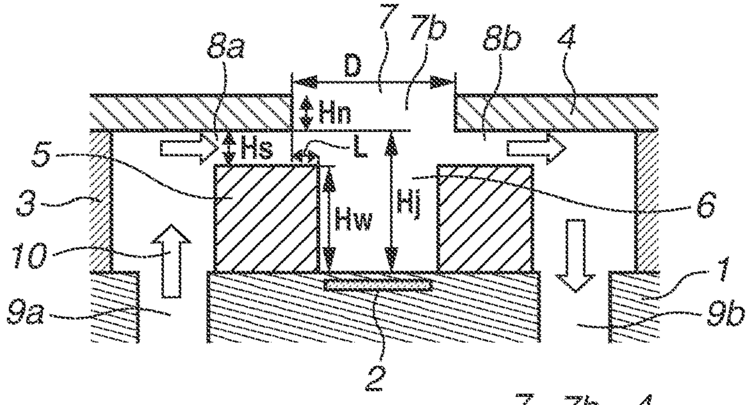
FIG. 2B is a cross-sectional view of the liquid ejection head taken along a line IIb-IIb of FIG. 2A.
Figure 2C:
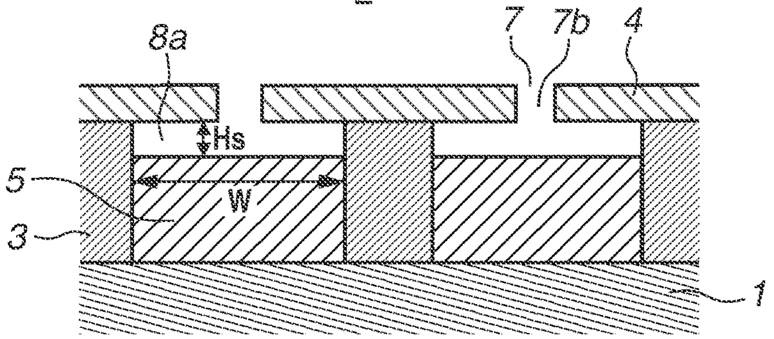
FIG. 2C is a cross-sectional view of the liquid ejection head taken along a line IIc-IIc of FIG. 2A.
Figure 2D:
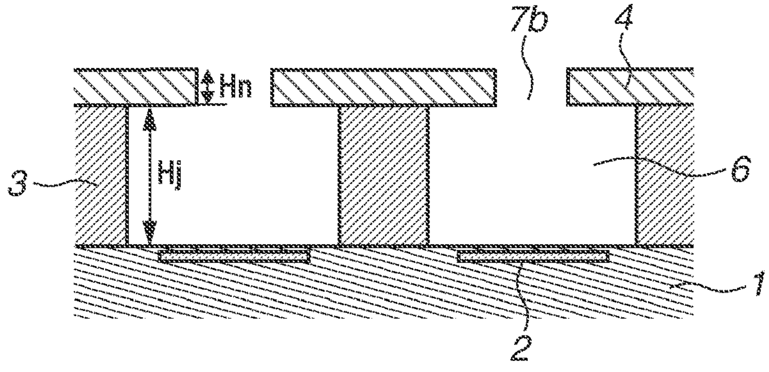
FIG. 2D is a cross-sectional view of the liquid ejection head taken along a line IId-IId of FIG. 2A.

FIG. 1 is a perspective schematic view of a printing element substrate 100 of a liquid ejection head according to a first embodiment of the present disclosure, and FIGS. 2A to 2D are enlarged views of a part in the vicinity of an ejection port 7 of the liquid ejection head. FIG. 2A is an enlarged plan view of the part in the vicinity of the ejection port 7 of the liquid ejection head, FIG. 2B is a cross-sectional view taken along a line lib-III) of FIG. 2A, FIG. 2C is a cross-sectional view taken along a line IIc-IIc of FIG. 2A, and FIG. 2D is a cross-sectional view taken along a line IId-IId of FIG. 2A.

As illustrated in FIG. 2B, the liquid ejection head of the present embodiment includes a substrate 1, a first flow path forming member 3 (flow path forming part) forming an individual flow path 8 for liquid on the front surface of the substrate 1, and an ejection port forming member 4 connected to an upper part of the first flow path forming member 3. The ejection port forming member 4 (ejection port forming part) has the ejection port 7 for ejecting liquid, and an ejection port part 7*b* (nozzle) communicating with the ejection port 7 and the individual flow path 8. The ejection port forming member 4 can have a layered structure including a plurality of layers. The substrate 1 includes an energy generating element 2 that generates energy for ejecting ink from the ejection port 7, a liquid supply path 9*a* for supplying ink into the individual flow path 8, and a liquid collection path 9*b* (outflow flow path) for draining ink out from the individual flow path 8.

In the ejection port forming member 4, the ejection port 7 is formed such that the ejection port 7 substantially faces the energy generating element 2, and thus the ejection port 7 and the energy generating element 2 form one ink ejection unit. As illustrated in FIG. 1, a plurality of ink ejection units arranged in a row on the printing element substrate 100 forms an ejection port array 110. While, in the present embodiment, the ejection ports 7 are arranged at an in-array density of 300 dots per inch (dpi) and the ejection port arrays 110 are formed in two rows in the printing element substrate 100, the number of the ejection port arrays 110 is not limited to the above described configuration.

FIG. 2B is a cross-sectional view in a direction parallel to the flow direction of ink 10 in the flow path. A liquid chamber 6 including the energy generating element 2 and a second flow path forming member 5 are disposed in the individual flow path 8 formed with the first flow path forming member 3. The individual flow path 8 formed between the second flow path forming member 5 and the ejection port forming member 4 includes an individual supply flow path 8*a*, which is on a side with the liquid supply path 9*a* and supplies liquid to the liquid chamber 6 and the ejection port 7, and an individual collection flow path 8*b* (individual outflow flow path), which is on a side with liquid collection path 9*b* and drains liquid out from the liquid chamber 6 and the ejection port 7. As long as the second flow path forming member 5 is disposed on a side with the individual supply flow path 8*a*, the position of the second flow path forming member 5 is not limited to a position to interpose the energy generating element 2. The second flow path forming member 5 can be formed integrally with the first flow path forming member 3.

The individual supply flow path 8*a* and the individual collection flow path 8*b* are connected to the liquid supply path 9*a* (supply flow path) and the liquid collection path 9*b* (outflow flow path), respectively, which are disposed on the substrate 1. With this configuration, the ink 10 supplied from the liquid supply path 9*a* flows a flow path that reaches the liquid collection path 9*b* via the individual supply flow path 8*a*, a part in the vicinity of the ejection port 7, the liquid chamber 6, and the individual collection flow path 8*b*. The flow path connected to the liquid chamber 6 and communicating with the liquid supply path 9*a* and the liquid collection path 9*b*, as a whole, can be referred to as the individual flow path 8. In the present embodiment, the individual supply flow path 8*a* is formed on the side with the liquid supply path 9*a* and the individual collection flow path 8*b* is formed on the side with the liquid collection path 9*b*, with respect to one liquid chamber, i.e., the liquid chamber 6.

The liquid supply path 9*a* and the liquid collection path 9*b* are disposed at positions between which the ejection port array 110 is disposed, in a direction parallel to the ejection port array 110. The liquid supply path 9*a* and the liquid collection path 9*b* are connected to a common supply path (not illustrated) and a common collection path (not illustrated), respectively, which are connected to an ink supply tank (not illustrated). In the present embodiment, the ink 10 circulates the inside of the individual flow path 8 up to the liquid ejection head and the ink supply tank disposed outside the individual flow path 8, by the pressure difference between the liquid supply path 9*a* and the liquid collection path 9*b*. The energy generating element 2 is driven to apply energy to the ink 10 supplied from the liquid supply path 9*a* to the liquid chamber 6 through the individual supply flow path 8*a*, and the ink is ejected from the ejection port 7, so that a liquid droplet is formed. The ink 10 not ejected from the ejection port 7 is guided from the liquid chamber 6 to the liquid collection path 9*b* through the individual collection flow path 8*b*. The energy generating element 2 of the present disclosure is not particularly limited in terms of configuration as long as the energy generating element 2 is an ejection element capable of controlling the ejection of the ink 10 from the ejection port 7. While, in the present embodiment, a resistance-type heater is used as an example of the energy generating element 2, other types of heater, such as a piezoelectric actuator and an open-close valve, can also be used. In addition, in the present disclosure, the means for supplying the ink 10 to the above-described circulation path is not limited to the differential pressure between the liquid supply path 9*a* and the liquid collection path 9*b*. Alternatively, a liquid flow generation source can be disposed in the individual flow path 8, in the liquid supply path 9*a* and the liquid collection path 9*b*, or in the common path. Examples of the liquid flow generation source include a resistance-type heater, a piezoelectric actuator, and an electroosmotic flow.

FIG. 2C is a cross-sectional view in the vicinity of the individual flow path 8 (individual supply flow path 8*a*) taken in a direction perpendicular to an ink flow direction in the flow path. The individual flow path 8 is formed by the ejection port forming member 4 and the second flow path forming member 5, and has a height $H_s$ (μm) in an ink ejection direction (direction of liquid ejection).

FIG. 2D is a cross-sectional view in the vicinity of the center of the liquid chamber 6 taken in the direction perpendicular to the ink flow direction in the flow path. The liquid chamber 6 is formed with the substrate 1, the ejection port forming member 4, and the first flow path forming member 3. In the ejection port forming member 4, the ejection port 7 is formed at a position corresponding to the energy generating element 2. A height from a surface where the energy generating element 2 is disposed in the liquid chamber 6 to a surface of the ejection port forming member 4 (ejection port part 7*b*) on the side with the individual flow path 8 in the ink ejection direction will be hereinafter expressed as height $H_j$ (μm). Similarly, a height from the surface where the energy generating element 2 is disposed in the liquid chamber 6 to the individual supply flow path 8*a* on a side with the liquid chamber 6 (the substrate side) will be expressed as height $H_w$ (μm). Here, desirably, the height $H_j$ is 40 μm or more, to obtain a large liquid-droplet volume intended in the present disclosure. Further, a diameter D (μm) of the ejection port 7 is, desirably, 20 μm or more. Satisfying the above-described conditions realizes a configuration advantageous to obtain an ink ejection amount (the volume of one ink droplet) of 20 picoliters (pL) or more.

As described above, in the present disclosure, the liquid chamber 6 satisfying $H_j>H_s$ is formed. In other words, a liquid chamber being recessed more than the individual supply flow path in a direction opposite to the direction of liquid ejection is disposed, whereby a large liquid-droplet volume intended in the present disclosure is realized. Thus, as compared with a case where the diameter D of the ejection port is increased as a means of increasing the liquid droplet volume, a distance between the adjacent ejection ports can be set short, which is advantageous in that resolution of the ejection port can be increased.

Figure 3:
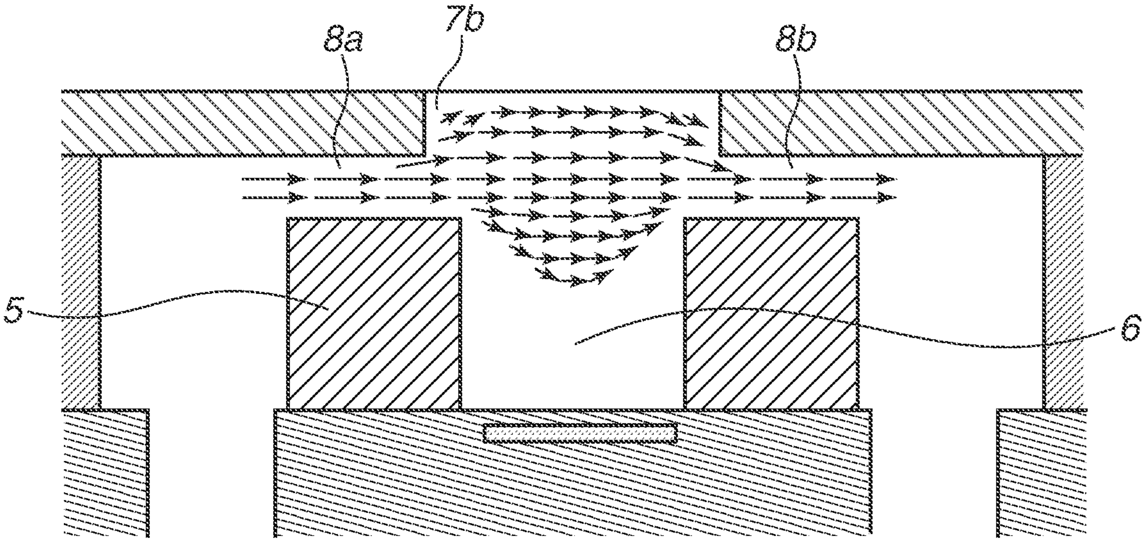
FIG. 3 is a diagram illustrating a flow distribution of an ink flow flowing through the liquid ejection head according to the first embodiment.
Figure 4:
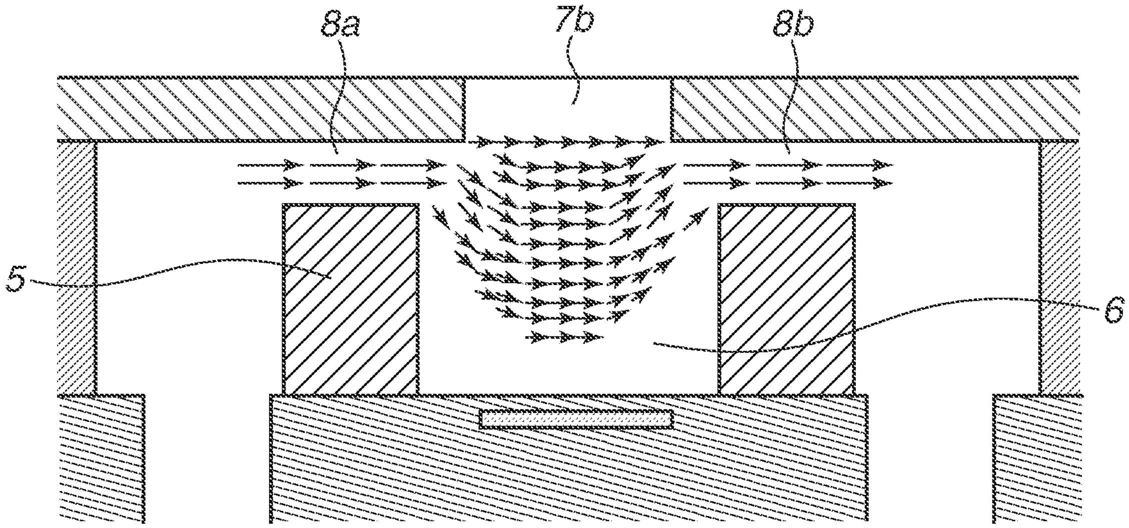
FIG. 4 is a diagram illustrating a flow distribution of an ink flow flowing through a liquid ejection head in a configuration according to a comparative example.

In the liquid ejection head of the present disclosure, desirably, the length of the opening of the liquid chamber 6 is less than the length (diameter D) of the ejection port 7 on a straight line passing through the center of the ejection port 7 in the ink flow direction. FIGS. 3 and 4 are diagrams each illustrating a flow distribution of ink in a state in which the circulation of ink flowing through the liquid ejection head is in a steady state. Arrows in each of FIGS. 3 and 4 indicate the speed of the flow of the ink, from the individual supply flow path 8*a* to the liquid chamber 6, the ejection port 7, and the individual collection flow path 8*b*, and the magnitude of the flow velocity of the ink is expressed by the length of each of the arrows. In the configuration illustrated in FIG. 3, the length of the opening of the liquid chamber 6 is less than the diameter D of the ejection port 7 on the straight line passing through the center of the ejection port 7 in the ink flow direction. In this case, the ink flows into the ejection port part 7*b*, reaches the vicinity of the liquid surface (meniscus position) of the ejection port 7, and then flows again through the ejection port part 7*b* toward the individual collection flow path 8*b*. In such an ink flow, the concentrated ink is constantly replaced by the ink supplied from the liquid supply path 9*a* not only in the ejection port part 7*b* that is easily affected by evaporation but also the vicinity of the liquid surface of the ejection port 7 where evaporation particularly occur.

Meanwhile, in the configuration illustrated in FIG. 4, the length of the opening of the liquid chamber 6 is greater than the diameter D of the ejection port 7 on the straight line passing through the center of the ejection port in the ink flow direction. In this case, the ink flow toward the ejection port part 7*b* is small, and concentrated ink in the ejection port part 7*b* is not sufficiently replaced.

As described above, it is desirable that the length of the opening of the liquid chamber 6 is less than the diameter D of the ejection port 7 on the straight line passing through the center of the ejection port 7 in the ink flow direction. In this case, in a plan view from the ink ejection direction, a sidewall surface of the second flow path forming member 5 (sidewall surface of the liquid chamber 6) on the side with the ejection port 7 in the ink flow direction is disposed within the ejection port 7. In this case, in an area where the second flow path forming member 5 and the ejection port 7 overlap each other with an overlap amount L, a flow field toward the inside of the ejection port part 7*b* is formed. Here, the overlap amount L indicates the length of the second flow path forming member 5 disposed within the ejection port 7 on the straight line passing through the center of the ejection port 7 in the ink flow direction, when viewed from the ink ejection direction (see FIG. 2B). With increase in the overlap amount L, efficiency of the ink entering the ejection port part 7*b* is increased, so that a strong ink flow toward the vicinity of the liquid surface of the ejection port 7 is formed. Even in a configuration in which the sidewall surface of the second flow path forming member 5 on the side with the ejection port 7 and an end surface of the ejection port 7 substantially coincide with each other (the overlap amount L=0), when viewed from the ink ejection direction, an ink flow formation effect similar to the effect in FIG. 3 can be obtained. Based on the foregoing, a configuration in which the overlap amount L is 0 or more is desirable. In the liquid ejection head of the present disclosure, an effect of the present disclosure can be obtained even in a case in which the length of the opening of the liquid chamber 6 is greater than the diameter D of the ejection port 7, as long as the overlap amount L on the side with the individual supply flow path 8*a* is 0 or more.

More desirably, the relationship between the height $H_s$ of the individual flow path 8 and the height $H_w$ of the liquid chamber 6 is $H_w \geq H_s$. With this configuration, the liquid droplet volume to be ejected is increased, and increase in liquid viscosity due to evaporation of liquid from the ejection port 7 is decreased. Specifically, a sufficient volume of the liquid chamber 6 is secured because the height $H_w$ is large, and moreover, the flow velocity of the ink increases because the height $H_s$ is small, whereby the ink easily flows into the ejection port part 7*b*.

In addition, it is more desirable that the relationship between a height (thickness) $H_n$ (μm) of the ejection port forming member 4 in the ink ejection direction and the height $H_w$ is $H_w \geq H_n$. With this configuration, the liquid droplet volume to be ejected is increased, and increase in liquid viscosity due to evaporation of liquid from the ejection port 7 is decreased. Specifically, a sufficient volume of the liquid chamber 6 is secured because the height $H_w$ is large, and moreover, the ink flowing into the ejection port part 7*b* easily flows the vicinity of the liquid surface of the ejection port 7 because the height $H_n$ is small.

Next, a condition for efficiently replacing the ink in the ejection port 7 will be described. FIG. 3 is a diagram illustrating a flow distribution of the ink 10 in the ejection port 7, the ejection port part 7*b*, the liquid chamber 6, and the individual flow path 8 in a state in which the ink flow (see FIG. 2B) of the ink 10 flowing through the individual flow path 8, the ejection port part 7*b*, and the liquid chamber 6 of the liquid ejection head is in a steady state. The arrows in FIG. 3 indicate the speed of the flow of the ink, and the magnitude of the flow velocity of the ink is expressed by the length of each of the arrows.

In the liquid ejection head of the present embodiment, an effect of causing the ink to flow efficiently into the ejection port part 7*b* can be obtained when the height $H_s$ of the individual supply flow path 8*a*, the height $H_n$ of the ejection port forming member 4, and the diameter D of the ejection port 7 in the ink flow direction have a relationship represented by the following inequality (1).

$$H_s^{-0.34} \times H_n^{-0.66} \times D > 1.7 \quad (1)$$

In the following description, the left-side value of the above-described inequality (1) will be referred to as circulation efficiency J. The ink flowing through the individual supply flow path 8*a* flows into the ejection port part 7*b* and returns to the individual flow path 8 (individual collection flow path 8*b*) as illustrated in FIG. 3, when the above-described inequality (1) is satisfied. This flow can reduce increase in viscosity of the ink in the ejection port part 7*b*. With increase in the value of the circulation efficiency, the effect of reducing increase in viscosity of the ink is obtained at a higher level.

Figure 5:
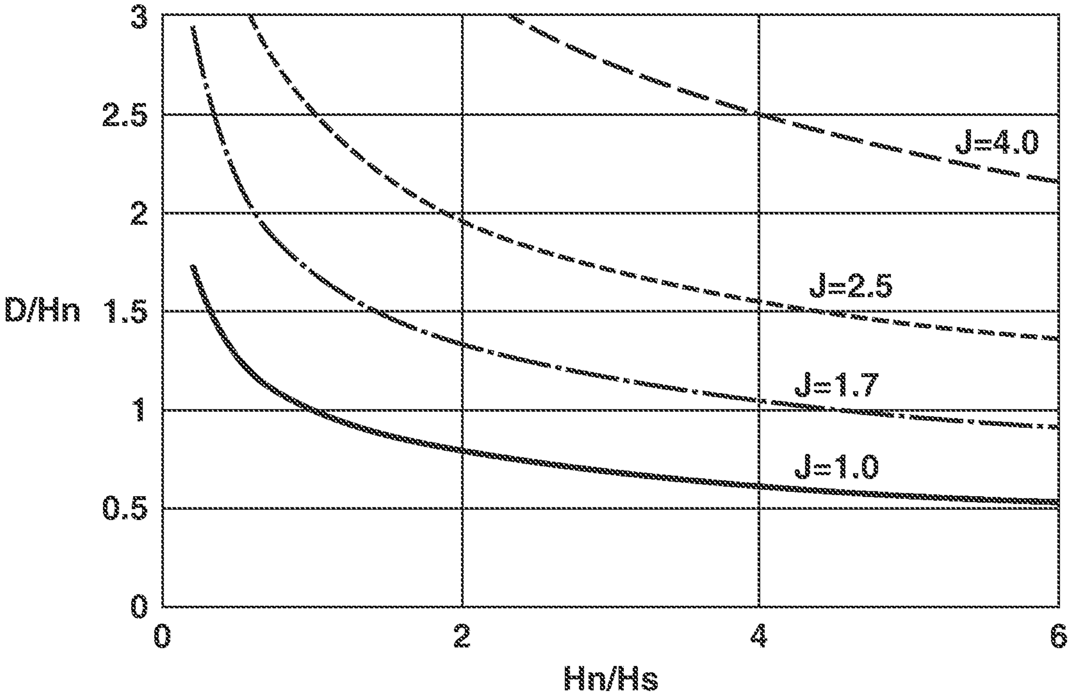
FIG. 5 is a diagram illustrating ink circulation efficiency in liquid ejection heads of various shapes.

The relationship between dimensions and circulation efficiency in the vicinity of the ejection port 7 in liquid ejection heads of various shapes including the liquid ejection head of the present disclosure will be described. FIG. 5 illustrates the relationship between structure dimensions and circulation efficiency J in the vicinity of the ejection port part. Four curves in FIG. 5 are contour lines each indicating the relationship among values that can be taken by $H_n$, $H_s$, and D, in a case where the circulation efficiency J is at 1.0, 1.7, 2.5, and 4.0, in the liquid ejection heads satisfying the above-described inequality (1). It is desirable that the liquid ejection head of the present disclosure have a configuration in which $H_s$, $H_n$, and D satisfy the above-described inequality (1) and which is in an area higher than a curve of J=1.7 in FIG. 5. In particular, a liquid ejection head in which $H_n$ is 15 μm or less, $H_s$ is 20 μm or less, and D is 30 μm or more in the ink ejection direction perform higher definition printing, and is therefore desirable.

An ink replacement amount in the ejection port part 7*b* is determined by a circulation flow velocity. In the present embodiment, the ink flow velocity at a part (individual supply flow path 8*a*) corresponding to the smallest height of a connection part between the individual flow path serving as the supply flow path and the liquid chamber is, for example, about 0.1 to 100 mm/sec. In this case, even in a case where ejection operation is performed in a state where ink flows while an ink flow is formed in the ejection port part 7*b*, an influence on landing accuracy and the like is relatively small.

Next, the influence of the dimensions, the circulation efficiency J, and the overlap amount L in the vicinity of the ejection port 7 in the liquid ejection head of the present disclosure on ejection stability will be described. FIG. 6 is a diagram illustrating the circulation efficiency J and the ejection stability in liquid ejection heads of various shapes. FIG. 6 illustrates stability of ink ejection performance in dimension configuration examples in the vicinity of the ejection port part, in a case where reference ink is used. Here, the reference ink is liquid that represents ink properties for the present liquid ejection head, and the viscosity and surface tension of the reference ink have been adjusted. For example, liquid in a range of ink viscosity of 1.5 to 10 centipoise (cP) and surface tension of 20 to 50 mN/m is used. As illustrated in FIG. 6, in Configuration Example 1 in which the above-described inequality (1) is satisfied and the circulation efficiency J is 4.4 that is sufficiently large, the ejection stability is satisfactory in both cases of L=0 and L=5. In Comparative Examples 1 to 3 in which the inequality (1) is not satisfied, satisfactory ejection stability is not obtained even in a case of L=5. In Configuration Examples 2 to 4 in which the circulation efficiency J is smaller than in Configuration Example 1, although the inequality (1) is satisfied, satisfactory ejection stability is obtained in the case of L=5. From the above-described results, it is apparent that, in addition to the size of the circulation efficiency J, the presence of the overlap amount L is important, to perform stable ejection while suppressing concentration of the liquid in the ejection port part in the liquid ejection head of the present disclosure.

Desirably, the overlap amount L has a sufficient length of $H_n$ or more. In this case, a sufficient inflow of ink into the ejection port part 7*b* can be obtained when the circulation efficiency J is about 1.7 μm or more satisfying the above-described inequality (1). On the other hand, in a case where the overlap amount L is small, a configuration for higher circulation efficiency J is used to cause the ink to sufficiently flow into the ejection port part 7*b*. As for the value of each of the circulation efficiency J and the overlap amount L, a value of each dimension in the liquid ejection head is determined such that an intended liquid droplet volume can be obtained.

As illustrated in FIG. 2A, in the present embodiment, a width W of the liquid chamber 6 in a direction orthogonal to the ink flow direction when viewed from the ink ejection direction is less than the width of the individual flow path 8. With this configuration, the flow velocity of the ink in the vicinity of the ejection port 7 is increased. In this configuration, however, an ink refill speed after ink ejection decreases. Thus, the structure can be selected based on the purpose to obtain an optimum outcome.

In addition, in the present embodiment, the ink flow direction is the same between ink ejection units adjacent in the ejection port array. Thus, reduction of ink concentration in the ejection port part 7*b* with respect to the plurality of ink ejection units can be realized by a differential pressure between the common supply path communicating with the plurality of liquid supply paths 9*a* and the common collection path communicating with the plurality of liquid collection paths 9*b*.

With the above-described configuration, even in a case where the concentrated ink stays in the ejection port part 7*b*, the ink supplied from the liquid supply path 9*a* flows into the ejection port part 7*b* by the ink flow, whereby the concentrated ink is pushed out to the outside of the ejection port part 7*b*. This reduces increase in viscosity in the ejection port 7 and reduces color unevenness of an image printed by ink ejection.

While, in the present embodiment, the inkjet printing apparatus (printing apparatus) having the configuration that circulates the liquid, such as ink, between the tank and the liquid ejection head is described, other configurations can be adopted.

Examples of configurations other than circulation of ink includes a configuration in which two tanks disposed at upstream and downstream sides of the liquid ejection head supply ink from one tank of the two tanks to the other tank, whereby ink in an individual flow path flows.

An example of a specific configuration in the present embodiment is as follows. The energy generating element 2 is a rectangle of 42 μm×30 μm, the height $H_j$ of the first flow path forming member 3 is 40 μm, and the height $H_n$ of the ejection port forming member 4 is 10 μm. The ejection port 7 is an ellipse with semicircular end parts and a long diameter in the ink flow direction, and has a long diameter (diameter D) of 45 μm, and a short diameter of 20 μm. The height $H_w$ of the second flow path forming member 5 is 30 μm, and the length in the ink flow direction is 30 μm. When viewed from the ink ejection direction, the width in the direction orthogonal to the ink flow direction is 60 μm in the vicinity of the liquid chamber 6 (W), and 70 μm in an area other than the vicinity of the liquid chamber 6. The overlap amount L is 7.5 μm, the height $H_s$ of the individual supply flow path 8*a* formed between the second flow path forming member 5 and the ejection port forming member 4 is 10 μm, and the length of the liquid chamber 6 in the flow direction is 35 μm. In this case, the circulation efficiency defined by the above-described inequality (1) is 4.5 μm. The ink viscosity is 4 cP, and the ink ejection amount (the volume of one ink droplet) in this case is about 25 pL.

When the differential pressure between the liquid supply path 9*a* and the liquid collection path 9*b* is 200 $mmH_2O$, the flow velocity of the ink inflow into the ejection port part 7*b* is 10 mm/sec at a maximum. Consequently, a sufficient ink flow toward the ejection port 7 can be obtained, and thus an effect of reducing the ink concentration in the ejection port 7 is obtained.

A liquid ejection head according to a second embodiment of the present disclosure will be described with reference to FIGS. 7A to 7D. The difference from the first embodiment will be mainly described below, and the redundant specific description of a configuration similar to the configuration of the first embodiment is omitted.

Figure 7A:
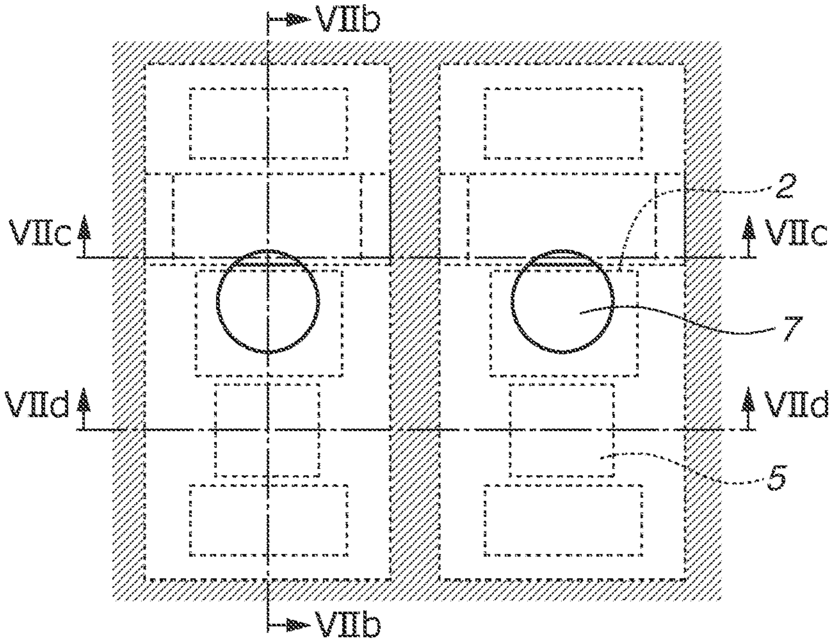
FIG. 7A is a plan view of a liquid ejection head according to a second embodiment of the present disclosure.
Figure 7B:
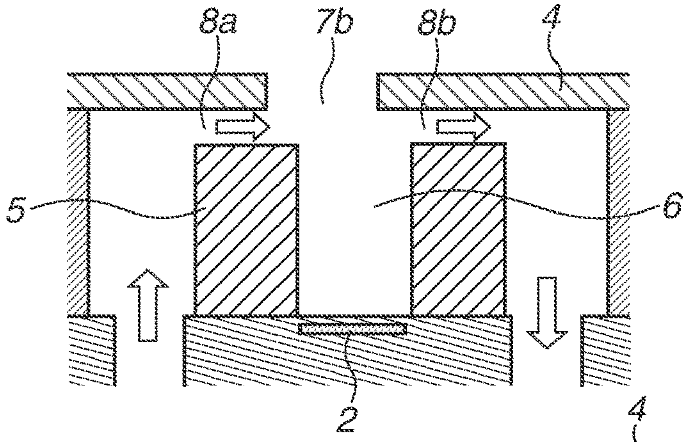
FIG. 7B is a cross-sectional view of the liquid ejection head taken along a line VIIb-VIIb of FIG. 7A.
Figure 7C:
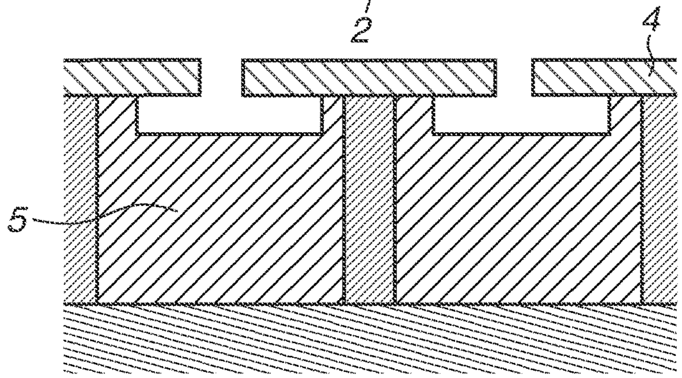
FIG. 7C is a cross-sectional view of the liquid ejection head taken along a line VIIc-VIIc of FIG. 7A.

FIG. 7A is an enlarged plan view of a part of the liquid ejection head according to the second embodiment of the present disclosure. FIG. 7B is a cross-sectional view taken along a line VIIb-VIIb of FIG. 7A, FIG. 7C is a cross-sectional view taken along a line VIIc-VIIc of FIG. 7A, and FIG. 7D is a cross-sectional view taken along a line VIId-VIId of FIG. 7A.

As illustrated in FIGS. 7A and 7B, in the present embodiment, the center of the ejection port 7 is shifted to the side with the individual supply flow path 8*a*, with respect to the center of the liquid chamber 6 on a straight line passing through the center of the ejection port 7 in the ink flow direction, when viewed from the ink ejection direction. In other words, when viewed from the ink ejection direction, the ejection port 7 is disposed at a position where the ejection port 7 overlaps a second flow path forming member 5 on the side with the individual supply flow path 8*a*, that is, there is the overlap amount L, whereby ink easily flows into an ejection port part 7*b*. Further, as illustrated in FIG. 7C, in the individual supply flow path 8*a*, the width in a direction orthogonal to a liquid flow direction is less than the width of the liquid chamber 6. Thus, the flow velocity of ink flowing into the ejection port part 7*b* is increased.

Figure 7D:
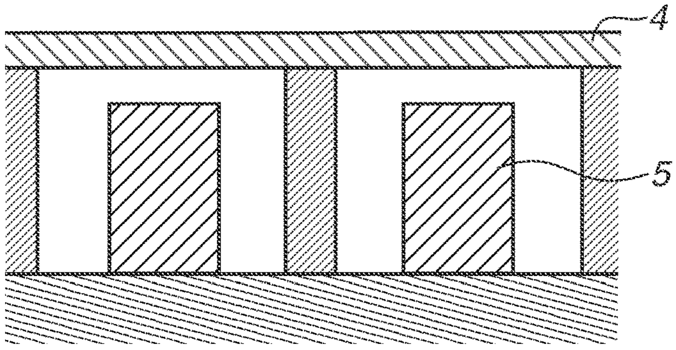
FIG. 7D is a cross-sectional view of the liquid ejection head taken along a line VIId-VIId of FIG. 7A.

As illustrated in FIG. 7D, in an individual flow path 8 on the side with the liquid collection path 9*b* in the present embodiment, the second flow path forming member 5 the width of which in the direction orthogonal to the liquid flow direction is less than the width of the individual flow path 8 is disposed. In this case, the individual flow path 8 on the side with the liquid collection path 9*b* includes, in addition to an individual collection flow path 8*b*, a bypass flow path between a first flow path forming member 3 and the second flow path forming member 5. Thus, flow resistance in the individual collection flow path 8*b* is reduced, whereby refilling the liquid chamber 6 and the ejection port 7 with ink after ink ejection proceeds faster. However, the flow velocity of ink flowing into the ejection port part 7*b* is reduced. Thus, the structure is determined to obtain an optimum outcome in consideration of circulation efficiency in the ejection port part 7*b* and an ink refill speed.

In addition, in the present embodiment, since the ejection port 7 is formed in a circle, ink ejection stability is increased. Alternatively, in a case where the ejection port 7 is formed in an ellipse having a length in the ink flow direction, ink easily flows into the ejection port part 7*b*. As for the shape of the ejection port 7 in the present disclosure, a known shape, such as a circle or an oval, can be used.

With the above-described embodiment, it is possible to reduce increase in viscosity of ink in the vicinity of the ejection port and to increase the volume of one ink droplet.

An example of a specific configuration in the present embodiment is as follows. The shift amount of the ejection port 7 with respect to the liquid chamber 6 is 7.5 μm, the diameter of the ejection port 7 is 30 μm, and the overlap amount L is 5 μm. The height $H_j$ of the first flow path forming member 3 is 60 μm, the height $H_n$ of an ejection port forming member 4 is 7.5 μm, and the height $H_w$ of the second flow path forming member 5 is 45 μm. The height $H_s$ of the individual supply flow path 8*a* formed between the second flow path forming member 5 and the ejection port forming member 4 is 15 μm, and in this case, the circulation efficiency J defined by the above-described inequality (1) is 3.2 μm. The width W of the liquid chamber 6 is 70 μm that is the same as the width of the individual flow path 8. The second flow path forming member 5 on the side with the liquid collection path 9*b* has a width of 30 μm, and is disposed at the center of the individual flow path 8, when viewed from the ink flow direction. Thus, the individual flow path 8 on the side with the liquid collection path 9*b* includes the bypass flow path having a width of 20 μm on each of both sides with respect to the second flow path forming member 5, when viewed from the ink flow direction. The ink viscosity is 3 cP, and the ink ejection amount (the volume of one ink droplet) in this case is about 35 pL.

An ink ejection head according to a third embodiment of the present disclosure will be described with reference to FIGS. 8A and 8B. The difference from the first embodiment will be mainly described below, and the redundant specific description of the configuration similar to the configuration of the first embodiment is omitted.

Figure 8A:
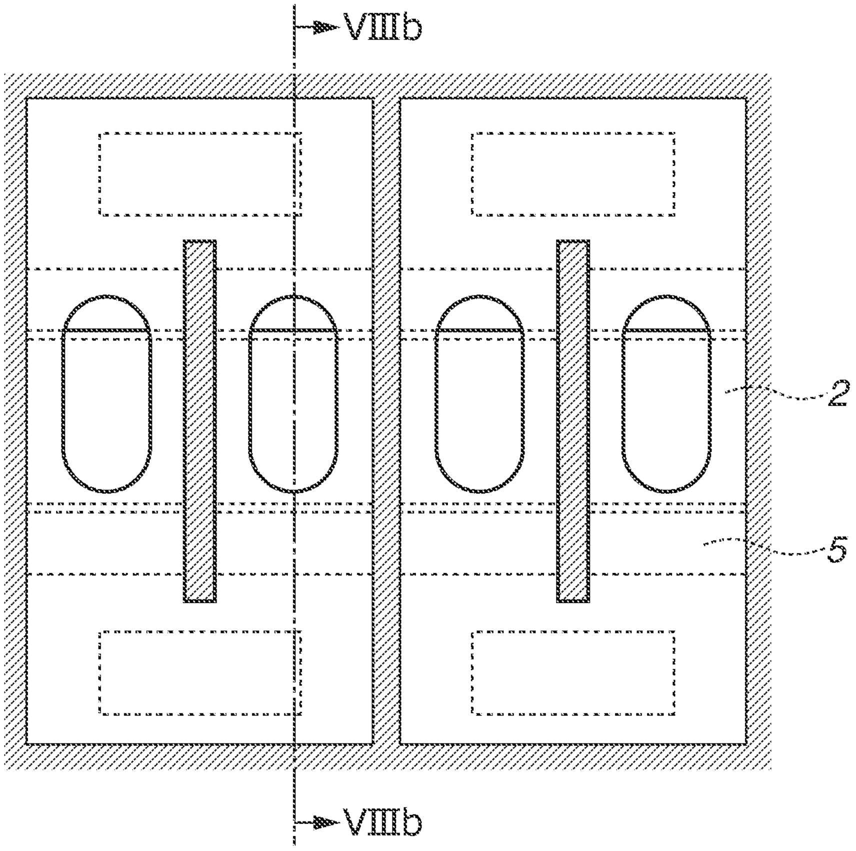
FIG. 8A is a plan view of a liquid ejection head according to a third embodiment of the present disclosure.
Figure 8B:
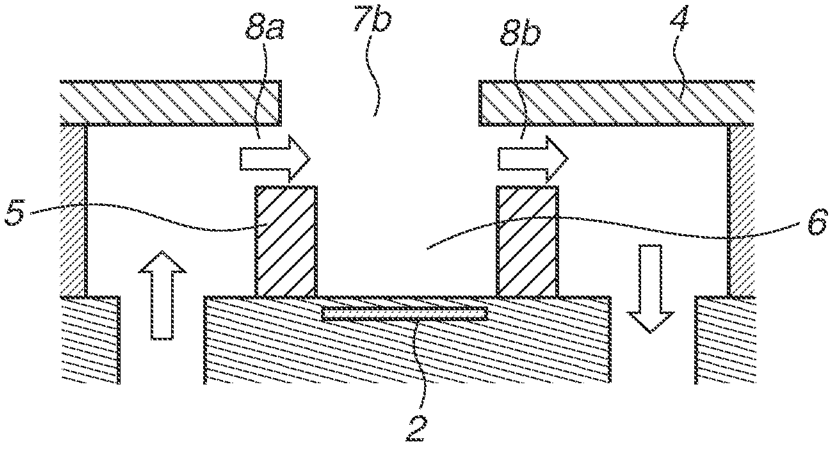
FIG. 8B is a cross-sectional view of the liquid ejection head taken along a line VIIIb-VIIIb of FIG. 8A.

FIG. 8A is an enlarged plan view of a part of the liquid ejection head according to the third embodiment of the present disclosure, and FIG. 8B is a cross-sectional view taken along a line VIIIb-VIIIb of FIG. 8A.

As illustrated in FIG. 8A, in the present embodiment, the individual flow path 8 is divided by a partition having a length in the liquid flow direction, and thus the resolution of the ejection port is increased.

In addition, it is possible to reduce the number of ejection ports to the half even with which printing resolution equivalent to that in a case where the partition is not present is obtainable.

An example of specific dimensions of each part in the present embodiment is as follows. The individual flow path 8 communicates with the liquid supply path 9*a* shared between adjacent two ink ejection units, and the resolution of the ejection port 7 is 600 dpi. The ejection port 7 is an ellipse form with semicircular end parts having a long diameter in the ink flow direction, and has a long diameter (diameter D) of 40 μm and a short diameter of 20 μm. The ejection port 7 is disposed at a position shifted by 10 μm to the side with the individual supply flow path 8*a* with respect to the liquid chamber 6, and the overlap amount L is 10 μm. The height $H_j$ of the first flow path forming member 3 is 44 μm, and the height $H_n$ of the ejection port forming member 4 is 10 μm. The height $H_w$ of the second flow path forming member 5 is 24 μm, the height $H_s$ of the individual supply flow path 8*a* formed between the second flow path forming member 5 and the ejection port forming member 4 is 15 μm, and the circulation efficiency J in an ejection port part 7*b* is 3.2 μm. The width W of the liquid chamber 6 is 36 μm that is the same as the width of the individual flow path 8, the length of the second flow path forming member 5 in the flow direction is 15 μm, and the energy generating element 2 is a rectangle of 35 μm×38 μm. The ink viscosity is 3 cP, and the ink ejection amount (the volume of one ink droplet) in this case is about 20 pL.

In FIGS. 8A and 8B, the overlap amount L on the side with the liquid supply path 9*a* is approximately equivalent to the height $H_a$ of the ejection port forming member 4. With this configuration, an effect of causing ink to flow into the ejection port part more efficiently can be obtained. In addition, the length of the second flow path forming member 5 in the ink flow direction is shorter than the length of a second flow path forming member 5 in the first and second embodiments. A volume in a part connecting the liquid supply path 9*a* and the liquid collection path 9*b* with the individual flow path 8 is thus increased, whereby refilling the liquid chamber 6 and the ejection port 7 with ink after ink ejection proceeds faster.

With the above-described embodiment, it is possible to reduce increase in viscosity of ink in the vicinity of the ejection port and to increase the volume of one ink droplet.

An ink ejection head according to a fourth embodiment of the present disclosure will be described with reference to FIG. 9. The difference from the first embodiment will be mainly described below, and the redundant specific description of a configuration similar to the configuration of the first embodiment is omitted.

Figure 9:
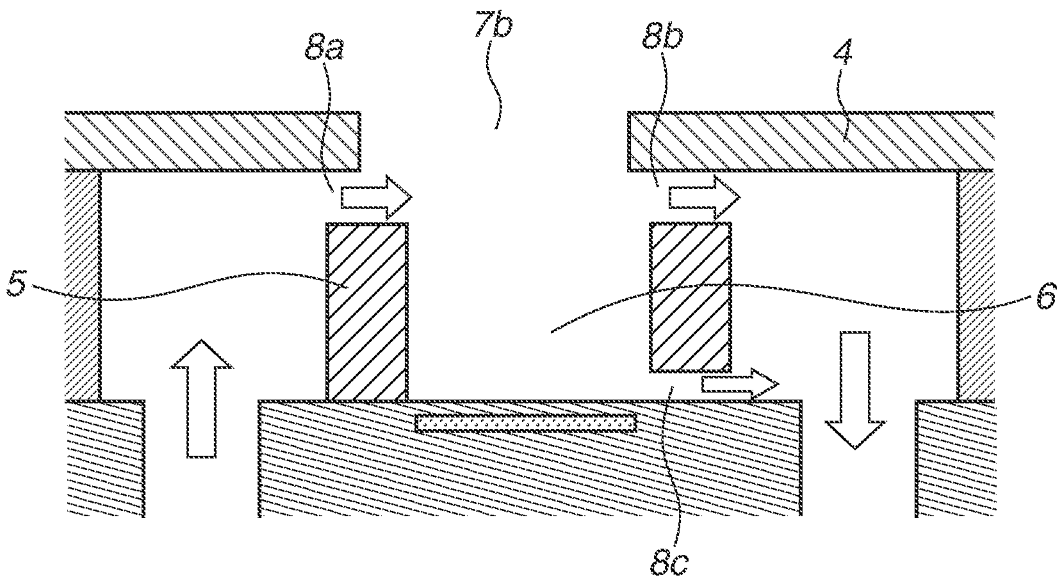
FIG. 9 is a diagram illustrating a structure of an ejection port and an ink flow path in the vicinity of the ejection port in a liquid ejection head according to a fourth embodiment of the present disclosure.

FIG. 9 is an enlarged cross-sectional view of a part of the liquid ejection head according to the fourth embodiment of the present disclosure.

In the present embodiment, the individual flow path 8 includes, in addition to the individual collection flow path 8*b*, a bypass flow path 8*c* communicating with the liquid chamber 6 and the liquid collection path 9*b* below the individual collection flow path 8*b*, when viewed from an ink ejection direction. In a configuration illustrated in FIG. 9, two flow paths that are the individual collection flow path 8*b* and the bypass flow path 8*c* are disposed at the respective positions at different levels in a substrate vertical direction on the side with the liquid collection path 9*b*. Thus, even in a case where the bubble accidentally stays in the liquid chamber 6, it is possible to obtain an effect of stabilizing ink ejection from the ejection port 7 by discharging a bubble. Further, in this configuration, since one flow path, which is the individual supply flow path 8*a*, is disposed on the side with liquid supply path 9*a*, ink efficiently flows into the ejection port part 7*b*.

In FIG. 9, while the three flow paths including the individual supply flow path 8*a*, the individual collection flow path 8*b*, and the bypass flow path 8*c*, are connected to the liquid chamber 6, the number of the bypass flow paths 8*c* can be two or more and can be disposed on the side with the individual supply flow path 8*a*. However, in a case of the configuration including the bypass flow path 8*c*, an ink circulatory flow flowing through the individual supply flow path 8*a* and the individual collection flow path 8*b* decrease, and an ink flow flowing into the ejection port part 7*b* also decrease. Thus, the arrangement of the bypass flow path 8*c* is determined based on the purpose.

The arrangement of the bypass flow path 8*c* connecting to the liquid chamber is not limited to the above described configuration as long as the arrangement achieves implementation of ink circulation efficiency of the ejection port part and bubble discharge from the liquid chamber, and ink replacement of a fixed amount of ink in the liquid chamber.

According to the above-described embodiment, it is possible to reduce increase in viscosity of ink in the vicinity of the ejection port and to increase the volume of one ink droplet.

An ink ejection head according to a fifth embodiment of the present disclosure will be described with reference to FIG. 10. The difference from the first embodiment will be mainly described below, and the redundant specific description of the configuration similar to the configuration of the first embodiment is omitted.

Figure 10:
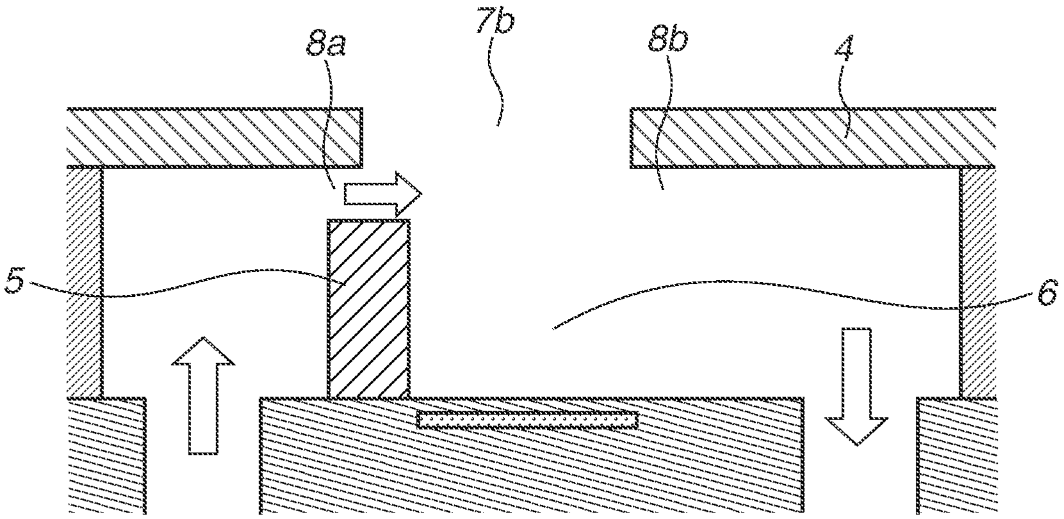
FIG. 10 is a diagram illustrating a structure of an ejection port and an ink flow path in the vicinity of the ejection port in a liquid ejection head according to a fifth embodiment of the present disclosure.

FIG. 10 is an enlarged cross-sectional view of a part of the liquid ejection head according to the fifth embodiment of the present disclosure. In the present embodiment, the second flow path forming member 5 is disposed at an individual supply flow path 8*a* on the side with the liquid supply path 9*a* and is not disposed at the individual collection flow path 8*b* on the side with liquid collection path 9*b*. In other words, a liquid chamber 6 and the individual collection flow path 8*b* are integrated with each other. In this case, the height of the individual flow path 8 on the side with the liquid collection path 9*b* is greater than the height of the individual flow path 8 on the side with the liquid supply path 9*a* (the individual supply flow path 8*a*). Thus, even in a case where the bubble stays in the liquid chamber 6, it is possible to discharge a bubble effectively from the liquid chamber 6, which leads to an effect of stabilizing ink ejection from an ejection port 7. Meanwhile, since the individual supply flow path 8*a* to which liquid is supplied is disposed in the vicinity of the ejection port 7, ink efficiently flows into the ejection port part 7*b*.

According to the above-described embodiment, it is possible to reduce increase in viscosity of ink in the vicinity of the ejection port and to increase the volume of one ink droplet.

A configuration of a printing element substrate of an ink ejection head according to a sixth embodiment of the present disclosure will be described with reference to FIGS. 11A to 11C. The difference from the first embodiment will be mainly described below, and the redundant specific description of a part having a configuration similar to the configuration of the first embodiment is omitted.

Figure 11A:
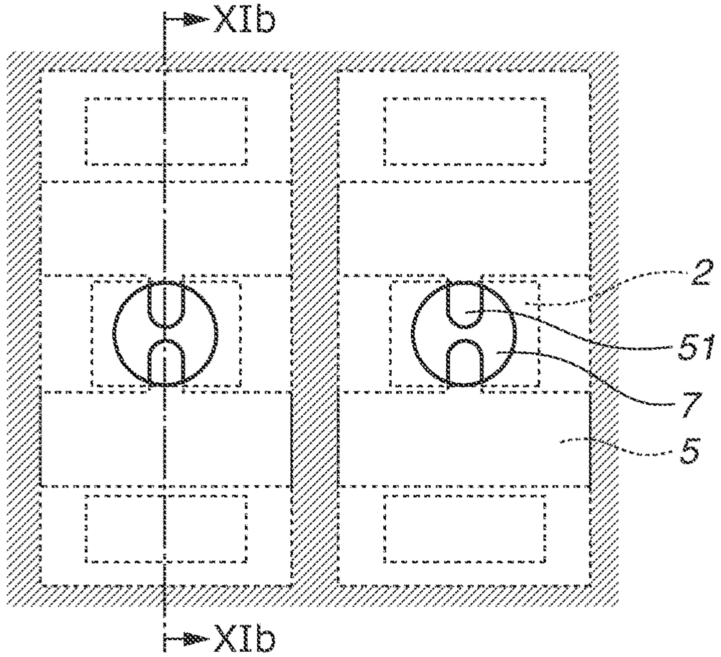
FIG. 11A is a plan view of a liquid ejection head according to a sixth embodiment of the present disclosure.
Figure 11B:
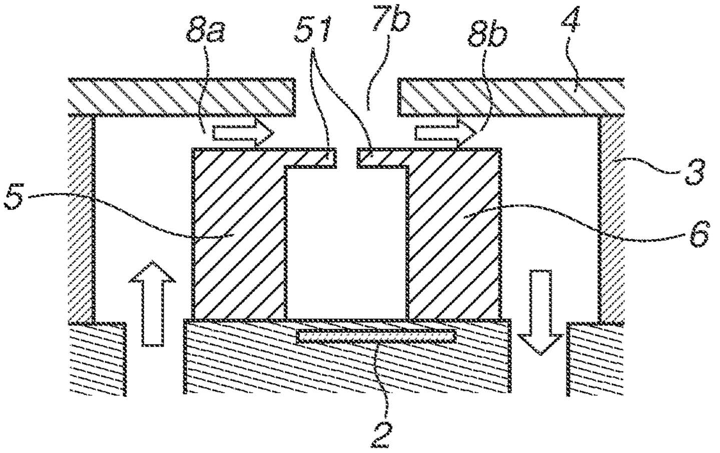
FIG. 11B is a cross-sectional view of the liquid ejection head taken along a line XIb-XIb of FIG. 11A.

FIG. 11A is an enlarged plan view of a part of the liquid ejection head according to the sixth embodiment of the present disclosure. FIG. 11B is a cross-sectional view taken along a line XIb-XIb of FIG. 11A.

In the present embodiment, the center of a liquid chamber 6 and the center of an ejection port 7 are aligned on a straight line passing through the center of the ejection port 7 in the ink flow direction, and the length of the liquid chamber 6 in the ink flow direction is greater than the diameter D of the ejection port 7. Thus, the configuration of the present embodiment has no overlap amount L between a second flow path forming member 5 and the ejection port 7. Meanwhile, when viewed from the ink ejection direction, protrusions 51 protruding toward the center of the liquid chamber 6 to overlap the ejection port 7 is disposed on a side wall of the second flow path forming member 5 on the side with the ejection port 7. The protrusions 51 are disposed on the straight line passing through the center of the ejection port 7 in the ink flow direction, when viewed from the ink ejection direction, and are disposed substantially symmetrical about the center of the ejection port 7, in the configuration illustrated in FIGS. 11A to 11C. Because of the protrusions 51, an effect of causing ink to flow easily into an ejection port part 7*b* is obtained. Further, the protrusions 51 in the configurations illustrated in FIGS. 11A to 11C are disposed to be substantially symmetrical about the center of the liquid chamber 6 on the straight line passing through the center of the ejection port 7 in the ink flow direction. Thus, the configurations lead to an effect of preventing twisting of ejected ink with respect to an ejection pressure by an energy generating element, whereby tailing of the ejected ink is stabilized. The protrusions 51 are not necessarily formed continuously from the second flow path forming member 5. As long as the protrusions 51 are disposed in the liquid chamber 6, the protrusions 51 can be formed such that the protrusions 51 are supported by the first flow path forming member 3, the ejection port forming member 4 or the substrate 1, or can be disposed more than one.

Figure 11C:
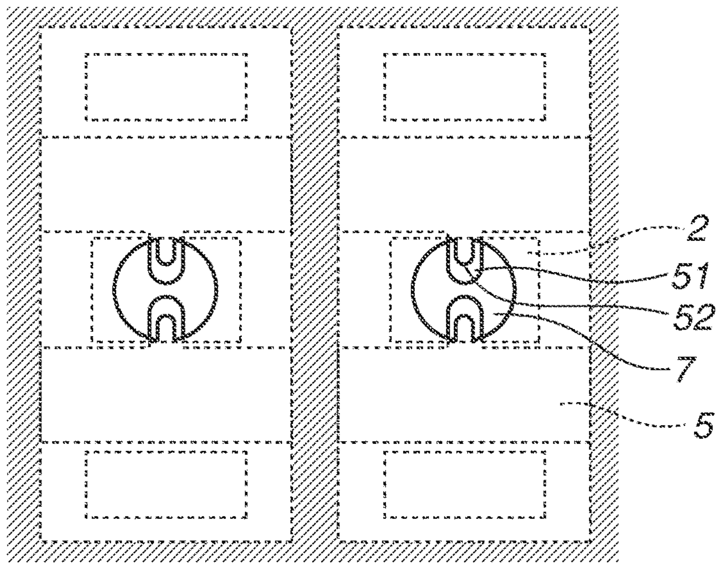
FIG. 11C is a plan view of the liquid ejection head.

In addition, as illustrated in FIG. 11C, protrusions 52 similar to the protrusions 51 of the second flow path forming member 5 can be disposed in the ejection port 7 as well, to stabilize ink ejection. In this case, although a circulatory flow of ink to the vicinity of the liquid surface of the ejection port 7 may reduce, the protrusions 52 disposed with the protrusions 51 in an overlapping manner when viewed from the ink ejection direction lead to an effect of causing ink to flow into the ejection port part 7*b*. In FIG. 11C, the protrusions 52 are on the straight line passing through the center of the ejection port 7 in the ink flow direction when viewed from the ink ejection direction. In addition, the protrusions 52 are disposed substantially symmetrical about the center of the ejection port 7. Because of the protrusions 52, an effect of reducing tailing of an ejected liquid droplet is obtained. More specifically, the meniscus of ink formed between the protrusions 52 is easily maintained as compared with the meniscus formed by other parts. Thus, tailing of a liquid droplet extending from the ejection port 7 can be cut at earlier timing, whereby generation of mist formed of minuscule droplets generated accompanying a main droplet can be reduced.

If the distance between the protrusions 52 is long, tailing of the ejected liquid droplet increases, which results in generation of small satellite droplets. Thus, desirably, the distance between the protrusions 52 on the straight line passing through the center of the ejection port 7 in the ink flow direction when viewed from the ink ejection direction is 5.0 μm or less. On the other hand, if the distance between the protrusions 52 is too short, forming of the protrusions is difficult and an ejected liquid droplet may be separated into two. Thus, desirably, the distance between the protrusions 52 is 2.0 μm or more. In other words, the distance between the protrusions 52 is, desirably, 2.0 μm or more and 5.0 μm or less.

According to the above-described embodiment, it is possible to reduce increase in viscosity of ink in the vicinity of the ejection port and to increase the volume of one ink droplet.

A configuration of a printing element substrate of an ink ejection head according to a seventh embodiment of the present disclosure will be described with reference to FIGS. 12A and 12B. The difference from the first embodiment will be mainly described below, and the redundant specific description of a configuration similar to the configuration of the first embodiment is omitted.

Figure 12A:
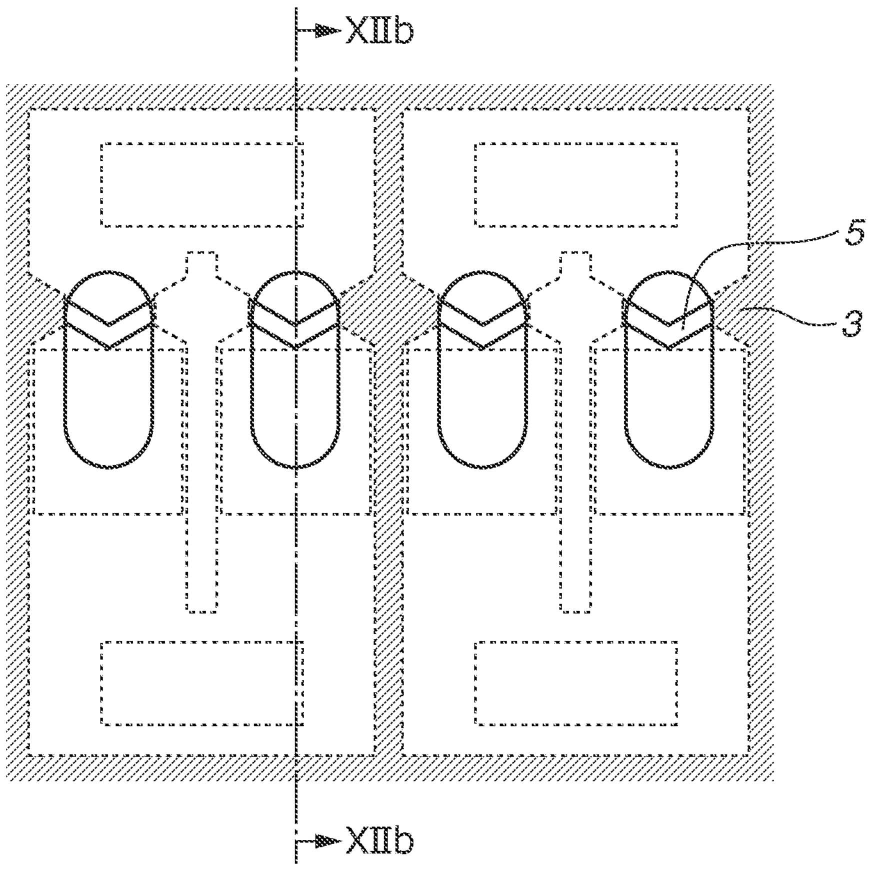
FIG. 12A is a plan view of a liquid ejection head according to a seventh embodiment of the present disclosure.
Figure 12B:
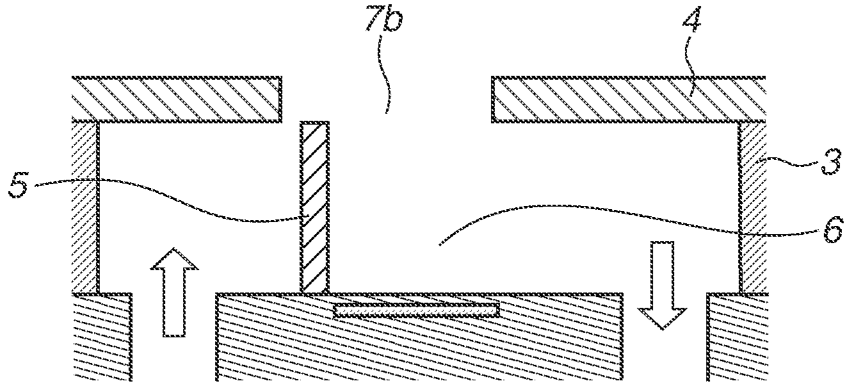
FIG. 12B is a cross-sectional view of the liquid ejection head taken along a line XIIb-XIIb of FIG. 12A.

FIG. 12A is an enlarged plan view of a part of the liquid ejection head according to the seventh embodiment of the present disclosure. FIG. 12B is a cross-sectional view taken along a line XIIb-XIIb of FIG. 12A.

In the present embodiment, the second flow path forming member 5 is disposed within an ejection port 7 when viewed from the ink ejection direction, and the height of a first flow path forming member 3 and the height of the second flow path forming member 5 are the same in the ink ejection direction. The second flow path forming member 5 is disposed such that the second flow path forming member 5 blocks a part of the individual flow path 8 on the side with the liquid supply path 9*a*. Because the width of the individual flow path 8 communicating with the ejection port part 7*b* from the side with the liquid supply path 9*a* is narrow, ink flows into the ejection port part 7*b* and pushes ink in the ejection port part 7*b*, and the pushed ink is discharged to a liquid collection path 9*b*. The arrangement and shape of each of the first flow path forming member 3 and the second flow path forming member 5 that determine the shape of the individual flow path 8 on the side with the liquid supply path 9*a* of the present embodiment are not limited to the structure illustrated in FIGS. 12A and 12B. These can be freely designed as long as ink efficiently flows into the ejection port part 7*b* under conditions in consideration of stability of ejected ink and an ink refill speed. Moreover, the stability of ink ejection can be enhanced by the ejection port 7 having a circular shape.

According to the above-described embodiment, it is possible to reduce increase in viscosity of ink in the vicinity of the ejection port and to increase the volume of one ink droplet.

According to the present disclosure, it is possible to provide a liquid ejection head capable of reducing increase in viscosity of liquid in a vicinity of an ejection port and also capable of ejecting a liquid droplet that is large in volume.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Applications No. 2022-108581, filed Jul. 5, 2022, and No. 2023-074226, filed Apr. 28, 2023, which are hereby incorporated by reference herein in their entirety.

What is claimed is:

1. A liquid ejection head comprising:

an ejection port forming part having an ejection port from which liquid is ejected;

a flow path forming part including a liquid chamber facing the ejection port in a direction of liquid ejection from the ejection port and configured to supply liquid to the ejection port, and an individual supply flow path configured to supply liquid to the liquid chamber; and a substrate including a supply flow path configured to cause liquid to flow into the individual supply flow path and an outflow flow path configured to cause liquid to flow out of the liquid chamber, wherein the following inequality is satisfied:

$$H_j > H_s,$$

where, in a direction perpendicular to a surface of the substrate, a height of the individual supply flow path is $H_s$ μm, and a height from a surface of the liquid chamber facing the ejection port to the ejection port forming member is $H_j$ μm, and wherein on a straight line passing through a center of the ejection port in a liquid flow direction when viewed from the direction perpendicular to the surface of the substrate, (1) a sidewall surface of the liquid chamber on a side with the supply flow path coincides with an end surface of the ejection port, or (2) the sidewall surface is disposed within the ejection port.

2. The liquid ejection head according to claim 1, wherein an energy generating element that generates energy for ejecting liquid from the ejection port is disposed in the liquid chamber.

3. The liquid ejection head according to claim 1, wherein the flow path forming part further includes an individual outflow flow path communicating with the liquid chamber and the outflow flow path.

4. The liquid ejection head according to claim 1, wherein liquid inside of the flow path forming part circulates to and from outside of the flow path forming part.

5. The liquid ejection head according to claim 1, wherein a length of an opening of the liquid chamber is less than a length of the ejection port on the straight line passing through the center of the ejection port in the liquid flow direction.

6. The liquid ejection head according to claim 1, wherein in a plan view from the direction of liquid ejection, the center of the ejection port is disposed on a side with the individual supply flow path with respect to center of the liquid chamber, on the straight line passing through the center of the ejection port in the liquid flow direction.

7. The liquid ejection head according to claim 1, wherein the supply flow path and the outflow flow path are disposed to be substantially symmetrical about the center of the ejection port, on the straight line passing through the center of the ejection port in the liquid flow direction.

8. The liquid ejection head according to claim 3, further comprising a bypass flow path communicating with the supply flow path or the outflow flow path and the liquid chamber.

9. The liquid ejection head according to claim 1, wherein a width in the liquid chamber in a direction orthogonal to the liquid flow direction is less than a width in the supply flow path, the outflow flow path, and the individual supply flow path.

10. The liquid ejection head according to claim 1, wherein the liquid chamber is recessed from the individual supply flow path in a direction opposite to the direction of liquid ejection.

11. The liquid ejection head according to claim 1, wherein the following inequality is satisfied:

$$H_s^{-0.34} \times H_n^{-0.66} \times D > 1.7,$$

where a height of the ejection port forming part in the direction of liquid ejection is $H_n$ and a length of the ejection port in the liquid flow direction is D μm.

12. The liquid ejection head according to claim 1, wherein in a case where a height of the ejection port forming part in the direction of liquid ejection is $H_n$, and a length of the ejection port forming part in the liquid flow direction is D μm, the height $H_n$ is 15 μm or less, the height $H_s$ is 20 μm or less, and the length D is 30 μm or more.

13. The liquid ejection head according to claim 1, wherein the height $H_j$ is 40 μm or more, a length D of the ejection port in the liquid flow direction is 20 μm or more, and an amount of liquid to be ejected from the ejection port is 20 pL or more.

14. A liquid ejection head comprising:

an ejection port configured to eject liquid;

an ejection port part configured to supply liquid to the ejection port;

an individual flow path configured to supply liquid to the ejection port;

a supply flow path configured to cause liquid to flow into the individual flow path; and an outflow flow path configured to cause liquid to flow out of the individual flow path, wherein the individual flow path includes a liquid chamber facing the ejection port in a direction of liquid ejection from the ejection port, and an individual supply flow path disposed at a position on a side with the supply flow path with respect to the liquid chamber in a liquid flow direction, wherein the liquid chamber is recessed on the side opposite to the direction in which the liquid is discharged from the individual supply channel, and wherein, when viewed from the direction of liquid ejection, on a straight line passing through center of the ejection port in the liquid flow direction, (1) a sidewall surface of the liquid chamber on a side with the supply flow path coincides with an end surface of the ejection port, or (2) the sidewall surface is disposed within the ejection port.

15. A liquid ejection apparatus comprising:

a liquid ejection head including an ejection port forming part including an ejection port from which liquid is ejected, a flow path forming part including a liquid chamber facing the ejection port in a direction of liquid ejection from the ejection port and configured to supply liquid to the ejection port, and an individual supply flow path for supplying liquid to the liquid chamber, and a substrate including a supply flow path configured to cause liquid to flow into the individual supply flow path and an outflow flow path configured to cause liquid to flow out of the liquid chamber, wherein the following inequality is satisfied:

$$H_j > H_s,$$

where, in a direction perpendicular to a surface of the substrate, a height of the individual supply flow path is $H_s$ μm, and a height from a surface of the liquid chamber facing the ejection port to the ejection port forming member is $H_j$ μm, wherein, when viewed from the direction perpendicular to the surface of the substrate, on a straight line passing through center of the ejection port in a liquid flow direction:

(1) a sidewall surface of the liquid chamber on a side with the supply flow path coincides with an end surface of the ejection port, or (2) the sidewall surface is disposed within the ejection port, and wherein in the liquid ejection head, liquid is circulated by supplying liquid to the supply flow path and draining liquid out from the outflow flow path.

* * * * *